United States Patent Office 2,707,181
Patented Apr. 26, 1955

2,707,181

METHOD FOR PREPARING SOLID DIAZONIUM SALTS

Lester N. Stanley, Delmar, and Alois C. Baggenstoss, Brookview, N. Y., assignors to General Aniline & Film Corporation, New York, N. Y., a corporation of Delaware No Drawing. Application June 12, 1951,
Serial No. 231,252

4 Claims. (Cl. 260—142)

This invention relates to an improved method for preparing, in dry form, aryl diazonium salt compounds, especially diazonium salts of strong inorganic acids, and aryl diazonium double salts with such acids and with complex-forming metals.

Aryl diazonium salts in dry form have been known for many years as "fast color salts," employed as intermediates in the preparation of azo dyes, especially for producing azo colorations on the fiber by combination with appropriate azo coupling components.

Aryl diazonium compounds are relatively unstable, often presenting serious hazards of fire or explosion, which increase upon concentration of aqueous solutions or recovery of the materials in dry form. Because of the instability of these compounds, contamination with decomposition products likewise presents a serious problem.

An early method for recovering aryl diazonium salts in dry form, involved, for example, concentration of an aqueous solution of the diazonium salt by evaporation under reduced pressure and elimination of residual water by adding a dehydrated hydrate-forming salt such as sodium sulfate to absorb the moisture. In another method, an aromatic amine was diazotized in concentrated sulfuric acid, and the excess acid was taken up by addition of sodium sulfate.

The double salts of the aryl diazonium compounds with complex-forming inorganic salts, especially halides, e. g. aryl diazonium chloride double salts with the chlorides of zinc, cadmium, copper, cobalt and similar complex-forming metals or with boron trifluoride, have been precipitated or salted out of aqueous solutions, recovered as a moist paste and mixed with a dehydrated hydrate-forming salt such as sodium, magnesium or aluminum sulfate, or patassium alum, to absorb moisture.

These processes are subject to the disadvantages of contamination of the product with impurities which impair the brilliance of azo colorations produced in their use with azo coupling components. In some cases, these procedures require inordinate amounts of materials and excessive equipment capacity, and are subject to the hazards of fire or explosion, especially during handling or concentration of the moist or dry diazonium salt compositions.

Water-miscible organic solvents such as acetone, ethyl acetate or ethanol have been included in diazotization mixtures, or added to an aqueous paste of the diazonium salt to remove impurities. Such solvents present an explosion and fire hazard of their own which is the more serious because of the unstable nature of the diazonium compounds.

Organic water-immiscible solvents have been suggested as diozotization media for aromatic amines, thus avoiding the presence of water and the necessity for its removal, but in such procedures, diazotization had to be carried out with nitrous gases, nitrosyl chloride or alkyl nitrites which are expensive, relatively toxic, and consequently undesirable for commercial operation.

It is an object of this invention to provide an improved process for preparing, in dry solid form, aryl diazonium salt compounds, particularly salts of strong inorganic mineral acids or aryl diazonium double salts with such acids and with complex-forming metals, in which the handling operations involved are simplified, the stability of the product is improved, the hazard of fire or explosion is minimized, and a purer product is obtained yielding optimum brilliance of shade when employed with azo coupling components for the production of azo dyestaff colorations.

In accordance with this invention, an aryl diazonium salt, produced by diazotization of an aryl amine in aqueous solution with a nitrite such as sodium nitrite and a strong inorganic acid such as sulfuric or hydrochloric acid, is precipitated as such, or in the form of a double salt formed by addition of an inorganic complex-forming compound, especially a halide, e. g. of a complex-forming metal such as a chloride of zinc, cadmium, cobalt, copper, tin, mercury, iron, arsenic, antimony, nickel or lead, or boron trifluoride. Conversion of the diazonium compound to a relatively stable double salt is preferred when the diazonium salt originally produced is too unstable for further processing and use. Precipitation of the diazonium salt compound is generally effected or rendered more complete by salting out, e. g. by addition of a water-soluble salt having a common anion with the diazonium salt produced, or may be effected by metathesis of the diazonium salt originally formed with a compound having an anion yielding a diazonium salt of lower solubility.

The precipitated aryl diazonium salt compound is separated, e. g. by filtration, decantation or centrifuging, from the bulk of the aqueous diazotization liquor so as to obtain the precipitated solids in the form of a moist paste. Without further removal of water, the paste is slurried with a volatile water-immiscible inert organic solvent, particularly a non-inflammable solvent, such as a polyhalogenated lower aliphatic hydrocarbon, e. g. carbon tetrachloride, chloroform, tetrachloroethylene or trichloroethylene. An inert water-absorbent salt, particularly a dehydrated hydrate-forming salt such as anhydrous magnesium sulfate, sodium sulfate, aluminum sulfate, or potassium alum, is also incorporated in the organic solvent-diazonium salt compound mixture.

The quantity of the dehydrating salt employed is at least sufficient to combine with all of the water present in the slurry to form a solid hydrate. A large excess, e. g. more than 50% above the amount theoretically required, is preferably avoided to prevent excessive dilution of the diazonium compound and, in general an amount up to 10% in excess of the amount theoretically required is preferably employed. The quantity of water-immiscible organic solvent is advantageously sufficient to form a fluid slurry with the solids, i. e., the diazonium salt and the hydrated water-absorbent salt. In general, an amount of organic solvent from 2 to 10 times the weight of the solids finally present is suitable.

Immediate transfer of the aryl diazonium salt compound as a moist paste from the filter press or centrifuge into an inert non-inflammable solvent, with incorporation of a water-absorbent salt, vastly reduces the hazard of fire or explosion otherwise involved in the further handling of the moist filter cake.

The organic solvent slurry thus obtained is filtered or centrifuged to remove the bulk of the solvent from the solids, and then dried, with addition, if desired, of an inert solid diluent to adjust the concentration of the diazonium salt compound in the final composition. The salts employed for absorption of water or other inert water-soluble salts can be used for the latter purpose. The residual solvent is evaporated at moderate temperatures, preferably not higher than 50° C. By carrying out the drying operation in a closed vessel, the vapor of the solvent affords an inert atmosphere, reducing the danger of fire or explosion. The organic solvent employed in the process can be recovered by distillation of the filtrate from the aforesaid fluid slurry, and by condensation of the vapors from the drier. The solvent thus recovered can be recycled in the process.

We have found that slurrying of the moist paste of aryl diazonium salt compounds in accordance with the invention with water-immiscible organic solvents, while absorbing the moisture present by incorporation of a water-absorbent salt, yields dry products upon removal of the solvent, having improved stability to explosion and fire, and greater purity, and yielding clearer solutions in water and more brilliant shades when combined with coupling components, than products obtained without the water-immiscible organic solvent treatment of this invention. Diazonium salt compounds, such as zinc chloride double salts of diazotized amino azo compounds, normally obtained as sticky or tarry materials, are readily recovered by treatment in accordance with this invention in granular solid form.

In addition to the foregoing advantages, the present process avoids tedious drying or evaporation of moisture, reduces the danger of handling moist pastes of aryl diazonium compounds, and the ready volatility of the organic solvent permits rapid drying of the diazonium salt compound with considerable saving in the time and equipment required.

The procedure in accordance with this invention is illustrated by the following examples, wherein parts are by weight.

*Example 1*

30 parts of 4-(o-tolylazo)-o-toluidine are thoroughly mixed with a solution of 34 parts of 21° Bé. hydrochloric acid in 150 parts of water. 150 parts of water and 25 parts of aqueous 31% sodium nitrite solution are added while maintaining the temperature of the reaction at 0° to 15° C. Diazotization is allowed to proceed to completion, while maintaining the temperature of the mixture within the aforesaid range, for one-half hour. An excess of nitrite, as indicated by blue coloration of starch iodide paper when spotted with the reaction mixture, is maintained in the mixture throughout diazotization. 60 parts of ice and 30 parts of 66° Bé. sulfuric acid are added, followed by 55 parts of sodium sulfate to salt out the diazonium sulfate. The resulting slurry is filtered to remove the bulk of the aqueous solution, and the resulting moist press cake is stirred into 220 parts of carbon tetrachloride. 32 parts of anhydrous magnesium sulfate (slightly in excess of the amount theoretically required to absorb the water present in the press cake) are added, and the mixture stirred for 30 minutes. The slurry is then filtered, the press cake washed with carbon tetrachloride, and dried for about 4 hours at 40 to 45° C. If desired, sufficient magnesium sulfate or sodium sulfate can be added prior to drying to adjust the final product to desired strength.

*Example 2*

51 parts of dianisidine are dissolved in a solution of 120 parts of 21° Bé. hydrochloric acid in 265 parts of water, and 112 parts of aqueous 31% sodium nitrite are added thereto. The solution is filtered, and 37.5 parts of zinc chloride are added to the filtrate, followed by 100 parts of sodium chloride to facilitate precipitation of the resulting zinc chloride double salt of 2,2'-dimethoxy-biphenyl-4,4'-bis-diazonium chloride. The mixture is filtered, and the resulting moist filter cake, as in the preceding example, mixed with anhydrous magnesium sulfate in an amount sufficient to take up all of the moisture and with carbon tetrachloride. The resulting slurry is filtered, washed and dried in the same manner as in Example 1.

*Example 3*

43 parts of 2-(2'-chloro-4'-nitrophenylazo)-5-methoxy-p-toluidine are diazotized in aqueous solution and precipitated therefrom as the zinc chloride double salt in the manner illustrated in the preceding example. The bulk of the aqueous solution is removed from the precipitate by filtration and the moist filter cake is stirred into 200 parts of carbon tetrachloride. About 32 parts of calcined magnesium sulfate are added and the mixture is stirred for about one-half hour. The resulting slurry is filtered, washed with carbon tetrachloride, and the press cake dried in accordance with the procedure of the preceding examples.

*Example 4*

29 parts of 4-phenylamino-o-anisidine are diazotized and salted out as the diazonium hydrochloride from the aqueous diazotization mixture. The slurry is filtered, and the moist filter cake is stirred into 175 parts of chloroform. About 32 parts of calcined magnesium sulfate are added and the mixture stirred for about one-half hour. Upon filtration, the diazonium chloride is obtained in the form of a filter cake which is washed with chloroform and dried.

*Example 5*

17 parts of m-chloroaniline are diazotized in aqueous solution and precipitated therefrom by addition of boron trifluoride in the form of the boron trifluoride complex of the corresponding diazonium compound. The slurry is filtered and the moist filter cake of the diazonium borofluoride complex stirred into 240 parts of tetrachloroethylene. About 60 parts of partly dehydrated aluminum sulfate are added, the amount being sufficient to absorb all of the water present, and the mixture stirred for about one-half hour. The slurry is then filtered, the filter cake washed with tetrachloroethylene and dried to obtain the diazonium borofluoride complex in solid dry form.

*Example 6*

34 parts of 3-amino-4-methoxy-benzene-sulfon-butylamide are diazotized in aqueous solution and precipitated in the form of the zinc chloride double salt in the manner illustrated in Example 2. The precipitate is separated in the form of a moist filter cake, and further processed in the manner described in Example 1 to obtain it in dry form.

*Example 7*

37 parts of 4'-amino-5'-chloro-o-benzanisidide are diazotized and separated in the form of the zinc chloride double salt in the manner employed in the preceding example. The precipitated double salt is separated as a moist filter cake from the aqueous mixture and worked up as described in Example 1 to obtain it in dry form.

*Example 8*

34 parts of 2-amino-4,4'-dichlorodiphenyl ether are diazotized in aqueous solution and precipitated in the form of the cobalt chloride complex double salt of the diazonium compound by addition of cobalt chloride. The resulting precipitate is separated in the form of a moist filter cake which is worked up in the manner described in the first example.

The procedure of this invention, as illustrated in the examples, can be similarly applied for the preparation, in dry solid form, of diazonium chlorides, sulfates or diazonium double salts, especially of diazonium chlorides with chlorides of zinc, cadmium, copper, cobalt, tin, mercury, iron, arsenic, antimony, lead, and nickel, or with boron trifluoride, obtained from the following arylamines, by diazotization and appropriate precipitation of the aforesaid salts:

Aniline
o-, m-, and p-Toluidine
Xylidines
Chlorotoluidines
p-Anisidine
Chloroanisidines
Benzidine
2,2'-dichlorobenzidine
Amino-toluene-sulfon-lower alkylamides
Anisidine-sulfon-lower alkylamides
p-Amino-diphenylamine
N-(p-aminophenyl)-α-naphthylamine
p-Acetamidophenylamine
Aminoazobenzene
Aminoazoxylene Diazonium salt compounds can be obtained from numerous other diazotized arylamines, arylene diamines, aminodiarylamines, acryaminoanilines, and aminoazo compounds, and converted in like manner to solid diazonium salts or double salts of inorganic acids in accordance with the invention.

As water-absorbent salts, anyhdrous or partially dehydrated sodium sulfate, aluminum sulfate or potassium alum can be employed instead of the magnesium sulfate disclosed in the examples. The inert non-inflammable organic solvents employed are preferably readily volatile, i. e., boiling not substantially higher than 125° C. to facilitate their evaporation at moderate temperature, but not so volatile as to cause excessive loss thereof during filtration or centrifuging of the organic solvent slurry. Thus, for example, the solvents preferably have a boiling point not substantially lower than 35° C. The solvent should be inert, water-immiscible and non-inflammable. The lower polychlorinated aliphatic hydrocarbons such as carbon tetrachloride, chloroform, tetrachloroethylene and trichloroethylene are especially suitable.

Other variations and modifications, which will be obvious to those skilled in the art, can be employed in the procedures hereinbefore described without departing from the scope or spirit of the invention.

We claim:

1. In a process for recovering aryl diazonium salt compounds of the class consisting or aryl diazonium salts of strong inorganic acids and aryl diazonium double salts of such acids, from an aqueous reaction mixture prepared by diazotization of the corresponding aromatic amine and precipitation of the aryl diazonium salt compound from the aqueous reaction mixture, the improvement which comprises separating the bulk of the aqueous solution from the precipitated aryl diazonium salt compound so as to leave the latter in the form of a wet paste, mixing said paste with a volatile water-immiscible, inert, non-inflammable polyhalogenated aliphatic hydrocarbon solvent boiling from 35 to 125° C., and concurrently with an inert hydrate-forming, water-absorbent dehydrated salt, the amount of said dehydrated salt being at least sufficient to combine with all of the water present to form a solid hydrate, and the amount of said organic solvent being sufficient to form a fluid slurry with the resulting solids, separating the suspended solids from the bulk of the organic solvent, and drying the solids at a temperature not substantially exceeding 50° C.

2. In a process for recovering aryl diazonium salt compounds of the class consisting of aryl diazonium salts of strong inorganic acids and aryl diazonium double salts of such acids, from an aqueous reaction mixture prepared by diazotization of the corresponding aromatic amine and precipitation of the aryl diazonium salt compound from the aqueous reaction mixture, the improvement which comprises separating the bulk of the aqueous solution from the precipitated aryl diazonium salt compound so as to leave the latter in the form of a wet paste, mixing said paste with a volatile water-immiscible, inert, non-inflammable polyhalogenated aliphatic hydrocarbon solvent boiling from 35 to 125° C., and concurrently with an inert hydrate-forming, water-absorbent dehydrated salt, the amount of said dehydrated salt being up to 50% in excess of the amount required to combine with all of the water present to form a solid hydrate, and the amount of said solvent being 2 to 10 times the weight of the solids present, separating the suspended solids from the bulk of the organic solvent, washing with fresh portions of said solvent, and drying the solids at a temperature not substantially exceeding 50° C.

3. In a process for recovering an aryl diazonium sulfate from an aqueous reaction mixture obtained by diazotization of the corresponding aromatic amine, and precipitation of the resulting aryl diazonium compound as a sulfate, the improvement which comprises separating the bulk of the aqueous solution from the precipitated aryl diazonium sulfate so as to leave the latter in the form of a wet paste, mixing said paste with carbon tetrachloride and concurrently with dehydrated magnesium sulfate, the amount of the latter being in excess, up to 10%, of the amount theoretically required to combine with all of the water present in the mixture, and the amount of carbon tetrachloride being 2 to 10 times the weight of the solids present, separating the suspended solids from the bulk of the carbon tetrachloride, and drying said solids at a temperature not substantially exceeding 50° C.

4. In a process for recovering an aryl diazonium chloride-zinc chloride double salt from an aqueous reaction mixture obtained by diazotization of the corresponding aromatic amine, and precipitation of the resulting aryl diazonium salt in the form of its zinc chloride double salt, the improvement which comprises separating the bulk of the aqueous solution from the precipitated aryl diazonium chloride-zinc chloride double salt so as to leave the latter in the form of a wet paste, mixing said paste with carbon tetrachloride and concurrently with dehydrated magnesium sulfate, the amount of the latter being in excess, up to 10%, of the amount theoretically required to combine with all of the water present in the mixture, and the amount of carbon tetrachloride being 2 to 10 times the weight of the solids present, separating the suspended solids from the bulk of the carbon tetrachloride, and drying said solids at a temperature not substantially exceeding 50° C.

References Cited in the file of this patent

UNITED STATES PATENTS

| | | |
|---|---|---|
| 1,767,798 | Jackman | June 24, 1930 |
| 2,000,995 | Seavey et al. | May 14, 1935 |
| 2,062,873 | Flett | Dec. 1, 1936 |
| 2,146,033 | Seavey et al. | Feb. 7, 1939 |
| 2,171,976 | Erickson | Sept. 5, 1939 |
| 2,612,494 | von Glahn et al. | Sept. 30, 1952 |